United States Patent [19]

Meyer

[11] 4,454,252

[45] Jun. 12, 1984

[54] PROCESS OF SEALING AND STRENGTHENING WATER-BEARING GEOLOGICAL FORMATIONS BY MEANS OF POLYURETHANE-RESIN-FORMING COMPOSITIONS

[75] Inventor: Frank Meyer, Essen, Fed. Rep. of Germany

[73] Assignee: Bergwerksverband GmbH, Essen, Fed. Rep. of Germany

[21] Appl. No.: 360,890

[22] Filed: Mar. 22, 1982

Related U.S. Application Data

[60] Continuation-in-part of Ser. No. 239,771, Mar. 2, 1981, abandoned, which is a continuation of Ser. No. 80,782, Oct. 1, 1979, abandoned, which is a continuation of Ser. No. 898,896, Apr. 21, 1978, abandoned, which is a continuation-in-part of Ser. No. 737,563, Nov. 1, 1976, abandoned, which is a division of Ser. No. 622,018, Oct. 14, 1975, abandoned.

[51] Int. Cl.$^3$ ............... C08G 18/08; C08G 18/24; C09K 17/00; E02D 3/12
[52] U.S. Cl. .................... 521/110; 521/126; 521/173; 521/904; 521/905; 523/132; 528/905; 528/58; 405/264
[58] Field of Search ............ 521/110, 126, 173, 904, 521/905; 528/905; 523/132

[56] References Cited

U.S. PATENT DOCUMENTS

| | | | |
|---|---|---|---|
| 3,091,551 | 5/1963 | Robertson | 521/126 |
| 3,267,047 | 8/1966 | Smitter et al. | 521/173 |
| 3,345,311 | 10/1967 | Ehrlich et al. | 521/173 |
| 3,347,804 | 10/1967 | Buckley | 521/126 |
| 3,450,648 | 6/1969 | Windemuth et al. | 521/126 |
| 3,493,525 | 2/1970 | Britain | 521/126 |
| 3,623,330 | 11/1971 | Nakade et al. | 521/110 |
| 3,822,223 | 7/1974 | Gemeinhardt et al. | 521/126 |
| 3,847,722 | 11/1974 | Kistuer | 528/904 |
| 3,894,131 | 7/1975 | Speech | 521/905 |

FOREIGN PATENT DOCUMENTS

| | | |
|---|---|---|
| 1129894 | 5/1962 | Fed. Rep. of Germany . |
| 1758185 | 10/1970 | Fed. Rep. of Germany . |
| 1784458 | 10/1971 | Fed. Rep. of Germany . |

*Primary Examiner*—H. S. Cockeram
*Attorney, Agent, or Firm*—Michael J. Striker

[57] ABSTRACT

Processes for sealing and strengthening water-bearing geological formations by injection thereinto a polyurethane-resin-forming composition that is especially suitable for this purpose which comprises a conventional polyisocyanate, a conventional polyol, an accelerator for the reaction between the polyisocyanate and the polyol, and a foam stabilizer.

8 Claims, No Drawings

PROCESS OF SEALING AND STRENGTHENING WATER-BEARING GEOLOGICAL FORMATIONS BY MEANS OF POLYURETHANE-RESIN-FORMING COMPOSITIONS

CROSSREFERENCE OF RELATED APPLICATIONS

The present application is a continuation-in-part application of application Ser. No. 239,771 filed Mar. 2, 1981 "PROCESS OF SEALING AND STRENGTHENING WATER-BEARING GEOLOGICAL FORMATIONS BY MEANS OF POLYURETHANE-RESIN-FORMING COMPOSITIONS", which in turn is a continuation application under Rule 60 of application Ser. No. 80,782, filed Oct. 1, 1979 "PROCESS OF SEALING AND STRENGTHENING WATER-BEARING GEOLOGICAL FORMATIONS BY MEANS OF POLYURETHANE-RESIN-FORMING COMPOSITIONS", which application is in turn a continuation application under Rule 60 of application Ser. No. 898,896, filed Apr. 21, 1978 "PROCESS OF SEALING AND STRENGTHENING GEOPLOGICAL FORMATIONS BY MEANS OF POLYURETHANE", which application Ser. No. 898,896 is in turn a continuation-in-part application of application Ser. No. 737,563, filed Nov. 1, 1976 "PROCESS OF SEALING AND STRENGTHENING WATER-BEARING GEOLOGICAL FORMATIONS AND POLYURETHANE-RESIN-FORMING COMPOSITIONS SUITABLE FOR USE THEREIN", which application Ser. No. 737,563, filed Nov. 1, 1976 is a divisional application under Rule 60 of application Ser. No. 622,018, filed Oct. 14, 1975 all now abandoned.

BACKGROUND OF THE INVENTION

The present invention pertains to processes for sealing and strengthening water-bearing geological formations by means of water-insensitive polyurethane-resin-forming compositions which comprise a conventional polyisocyanate, a conventional polyol together with a conventional accelerator and a foam stabilizer that is a poly(dimethylsiloxane)-poly(oxyalkylene) block polymer.

In Federal Republic of Germany Pat. No. 1,129,894, a process is described for the sealing and strengthening of geological formations against water or gas with a polyurethane resin which process consists essentially of injecting under pressure into the formation that is to be sealed and strengthened a composition consisting essentially of a mixture of toluene diisocyanate and a polyol containing at least three reactive hydroxyl groups in a liquid carrier.

Polyurethane resins have also been used to strengthen piles of coal and loose mountain formations which have a tendency to collapse, as described in Federal Republic of Germany Pat. Nos. 1,758,185 and 1,784,458. In such processes, a small amount of water is added to the polyol component which produces a foaming of the polyurethane resin after it has been placed in the formation that is to be sealed and strengthened. The foaming is due to the reaction of the water with the isocyanate radicals of the polyisocyanate with the formation of carbon dioxide and urea derivatives.

In order to perform successfully such sealing and strengthening operations, it was necessary that the geological formation be dry. Only after hardening or setting of the liquid resin in the geological formation was sealing or strengthening achieved, after which this presence of water or gas was no longer of consequence or detrimental. It was not possible to seal or strengthen water-bearing fissures or cracks in accordance with heretofore known processes and with the known resin-forming compositions specified for use therein because the isocyanato or carbonylamino group of the polyisocyanate reacted so vigorously to form urea derivatives and evolve carbon dioxide that the major portion of the polyisocyanate was lost before a polyurethane resin could be formed or the pores of the resulting foam were so large that the said foam had insufficient strength.

In reports of actual experiences it was explicitly stated that, in such strengthening and sealing operations with polyurethane resins, water must be kept out of the region of the geological formation that was to be strengthened therewith (see, for example, the article by Ivo Kaiser that was published in Glückauf, Volume 108, No. 19, pages 865–866).

SUMMARY OF THE INVENTION

Water-insensitive polyurethane-resin-forming compositions have now unexpectedly been found which make it possible to seal and strengthen water-bearing fissures and cracks in geological formations. Heretofore such polyurethane-resin-forming compositions as were available for this purpose could only be used in the absence of water, as stated hereinbefore. The water-insensitive polyurethane-resin-forming compositions of the present invention consist essentially of a conventional polyisocyanate and a conventional polyol component together with a catalyst for reacting the isocyanate group of the polyisocyanate with the hydroxyl group of the polyol and a foam stabilizer consisting of a poly(dimethylsiloxane)poly(oxyalkylene) block polymer. At least 0.1 and at most 4.0%, and preferably 0.5 and 2.0%, by weight of the accelerator or catalyst, and at least 0.5 and 5.0%, and preferably at least 0.5 and at most 2.0%, by weight of the foam stabilizer, based upon the total weight of the mixture of the polyisocyanate and polyol components, are normally adequate.

Especially suitable accelerators or catalysts for promoting the reaction of the polyisocyanate and polyol are salts of carboxylic acids and heavy metals such as, for example, ferrous di-2-ethylhexanoate, manganous di-2-ethylhexanoate, cupric di-2-ethylhexanoate, zirconium di-2-ethylhexanoate, and cobaltous di-2-ethylhexanoate, zinc octanoate, zinc salts of mixtures of branched-chain carboxylic acids having from 6 to 20 carbon atoms, especially salts or soaps of such metals and alkanoic acids having from 8 to 18 carbon atoms, as well as organometallic salts of such carboxylic acids, such as di-n-butyltin di-2-ethylhexanoate, di-n-butyltin dilaurate, and di-n-butyltin dioleate.

As foam stabilizers which promote the stabilization of the foam during the primary stage of the foam formation that are especially suitable as the components of the compositions that are used in the present invention are poly(dimethylsiloxane)-poly(oxyalkylene) block polymers, especially such block polymers as are liquid, which have the general formula

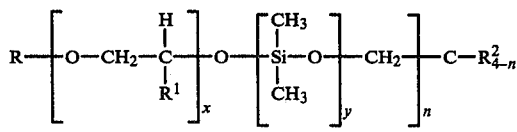

in which formula

R is an alkyl radical having at most 6 carbon atoms,
$R^1$ and $R^2$ are each hydrogen or an alkyl radical having at most 4 carbon atoms,
x is at least 3 and at most 7,
y is at least 2 and at most 8,
n is at least 3 and at most 4.

Especially useful foam stabilizers, which are used in the examples which follow, are the following:

Stabilizer A

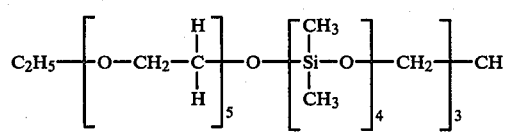

Stabilizer B

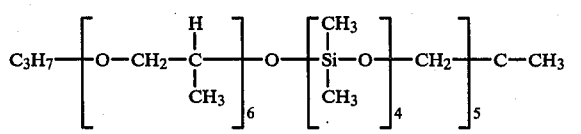

Because of the powerful catalytic or accelerating effect of the accelerator on the reaction of the polyisocyanate and the polyol and the stabilizing effect of the foam stabilizer in stabilizing and resisting wetting of the composition by the water, the effect of water on the liquid polyurethane-resin-forming composition is so greatly suppressed that the conversion of the polyisocyanate into other substances is avoided and effective sealing and strengthening of water-bearing fissures and pores in geological formations is consistently attained.

By the term polyurethane-resin-forming composition, as used herein, are to be understood compositions containing individual polyisocyanates and polyols which, upon mixing, undergo reactions to produce the required polyurethane resin.

Polyols that are especially suitable for use in these compositions are polyether glycols having a molecular weight between 400 and 600 and a hydroxyl number between 340 and 400, such as are described for example on pages 50 and 51 of Volume 14 of Ullmanns Encyclopädie der technischen Chemie, Third Edition, Urban and Schwarzenbach, Munich, 1963, which includes for example, polyether glycols such as those produced by reaction of propylene oxide and trimethylolpropane, which has a hydroxyl number between 320 and 370 and is referred to herein as Polyol I, and that having a hydroxyl number between 340 and 400 produced by reaction of propylene oxide with a condensation product of sucrose and 1,2-propanediol in the molecular ratio of 5 mols of 1,2-propanediol to each mol of sucrose, which is referred to herein as Polyol II. To these polyols can also be added polyols which are also plasticizers such as castor oil as well as other special polyether glycols.

The polyol component is generally mixed with about an equal volume of the polyisocyanate component. Generally, commercially available polyisocyanates in the form of isomeric mixtures of polyisocyanates containing more than one isocyanato radical per molecule are usable, such as, for example, toluene diisocyanates, hexamethylene diisocyanates, and diphenylmethane diisocyanates, as well as mixtures of diphenylmethane diisocyanate containing polyisocyanates of polyphenylpolymethanes.

Generally, no defined organic compound serves in practice as plasticizer, but rather technical products which are in commerce under trade names. The exact composition of these products is not known, except perhaps the identity of the main component.

As plasticizer may be used difunctional polyols, OH-number 280 with a mean molecular weight greater than 400 g/mol. Corresponding technical products are, e.g.
Lupranol 1000 (polypropyleneglycol, mean molecular weight 2000);
Lupranol 1100 (polypropyleneglycol, mean molecular weight 1000);
Lupranol 1200 (polypropyleneglycol, mean molecular weight 450); all from the firm Badische Anilinund Sodafabriken AG (BASF).

Equivalent technical products are: K 95 (polypropyleneglycol, mean molecular weight 450) K 190 (polypropyleneglycol, mean molecular weight 2000); both from Bayer AG.

Also trifunctional polyols with an OH-number greater than 210 and mean molecular weight greater than 800 g/mol may be used. Examples include e.g. castor oil and the technical product Cp 3001 (composed substantially of glycerine-started polypropyleneglycol, mean molecular weight 3000) of Dow Chemical.

Finally, tetrafunctional products with an OH-number greater than 185 and mean molecular weight greater than 1200 g/mol may be used. E.g. K320 of Bayer AG. K320 contains essentially ethylenediamine-started polypropyleneglycol, mean mol. wght. of 3400.

DESCRIPTION OF THE PREFERRED EMBODIMENTS

The polyurethane-resin-forming composition of the present invention can be evaluated as follows:

The test apparatus consists of a receptacle having a diameter of 320 millimeters and a height of 420 millimeters. The bottom of this receptacle is perforated with sixteen round holes each having a diameter of 10 millimeters that were drilled therethrough. The receptacle is provided with an injection pipe which has a length of 310 millimeters and a diameter of 12.7 millimeters and extends upwardly from the bottom of the receptacle and is provided with an inlet and twenty-eight bored holes each having a diameter of 4 millimeters that open into the receptacle. Above this pipe is another pipe having a length of 100 millimeters and a diameter of 12.7 millimeters which passes through the top cover of the receptacle. This second pipe has four bored holes each having a diameter of 8 millimeters and is also fixed to the cover of the receptacle. Both abutting ends of the pipe are sealed and can be held together with a clamp or similar device.

This test apparatus is used in the following manner: The receptacle is filled with stone granules having various sizes and is then tightly sealed with the cover by means of a clamping hoop or ring and an additional pressure plate. Water is then charged into the second pipe at a flow rate such that the amount discharged through the perforations at the bottom of the receptacle is 8 liters per minute.

The freshly mixed polyurethane-resin-forming composition is then forced into the receptacle through the first pipe while the water is flowing therethrough at a specified rate. Because of the constant trickling of the water over the stones, the injected polyurethane-resin-forming composition passing with the water through the perforations completely plugs or seals the perforations within a short period. Thereafter more of the polyurethane composition is injected through the first pipe until the receptacle is about two-thirds filled with the foamed polyurethane resin. The plugged receptacle is then allowed to stand while a water pressure of 4.2 bar is applied to and maintained in the receptacle. With the polyurethane-resin-forming compositions of the present invention, the perforations of the receptacle are sealed so tightly after 24 hours that not even a trace of water can be detected flowing therefrom.

For further examination, the receptacle can be opened. It was observed that the spaces between the stones and pores of the stones had been completely filled with resin and so joined together that an integral solid body of stone and hardened resin was formed. A small amount of water was absorbed by the liquid polyurethane-resin-forming composition. A determination of the bulk density of the mass indicated that the resin had foamed or expanded to about 5 to 6 times its original volume.

The invention is illustrated further in connection with the following examples which demonstrate that the sealing action of the polyurethane-resin-forming compositions of the present invention depend upon the kind and amount of the added accelerator and foam stabilizer. The test apparatus and method that was described hereinbefore was used in all the examples and the periods that are specified are the elapsed intervals between the beginning of the injection of the polyurethane-resin-forming composition and the time at which any significant flow of water from the receptacle stopped.

EXAMPLE 1

To a mixture of equal volumes of diphenylmethane diisocyanate and Polyol I that was referred to hereinbefore, which is a condensation product of propylene oxide and trimethylolpropane having a molecular weight between 400 and 600 and a hydroxyl number between 320 and 370, were added 15% by weight of castor oil, 0.5% by weight of di-n-butyltin dilaurate-$[(C_4H_9)_2Sn(OOCC_{11}H_{23})_2]$ as an accelerator, and 1% by weight of the foam stabilizer A which was described hereinbefore. The mixture was then intimately mixed and injected under pressure into the perforated receptacle that was described hereinbefore which was filled with stone granules while a flow of water equivalent to 8 liters per minute was passed through therewith. After 155 seconds the flow of water from the perforations had practically stopped and no water flowed therefrom while the pressure of the water was maintained at 4.2 bar.

COMPARATIVE EXAMPLE A

For comparison, Example 1 was repeated but the foam stabilizer A was omitted from the composition. The flow of water from the perforations in the receptacle ceased after 200 seconds but started again after 4 hours. On opening the receptacle, it was found that the interstices between the stones were filled with a very brittle, hardened resin which was easily crumbled. Analysis of this resin showed that it was composed of more than 60% of polyurea derivatives.

COMPARATIVE EXAMPLE B

For further comparison, Example 1 was repeated but the di-n-butyltin dilaurate accelerator was omitted from the composition. Since the flow of water did not cease 12 minutes after the composition had been injected into the receptacle and the flow of water was started, and no sealing of the interstices between the stone granules was achieved, the experiment was discontinued after that period.

EXAMPLE 2

To a mixture of equal volumes of tolylene diisocyanate and Polyol II that was referred to hereinbefore, produced by reaction of propylene oxide with a condensation product of sucrose and 1,2-propanediol in the molecular ratio of 5 mols of 1,2-propanediol per mol of sucrose, were added 50% by weight of castor oil, 0.8% by weight of stannous octanoate and 1% by weight of foam stabilizer B which was described hereinbefore, and the mixture was intimately mixed and then injected into the test receptacle and treated in accordance with the method that was described hereinbefore. After 102 seconds, stoppage of the flow of the water through the perforated bottom of the receptacle was observed and no further flow of water was noted during the next 24 hours while the pressure in the receptacle was maintained at 5.5 bar.

EXAMPLE 3

Exactly as described in Example 2 hereinbefore, 0.5% by weight of di-n-butyltin di(2-ethylhexanoate) and 1.3% by weight of the foam stabilizer A that was described hereinbefore were added to and intimately mixed with a mixture of equal volume of hexamethylene diisocyanate (1,6-diisocyanatohexane) and the Polyol I that was used in Example 1 and the mixture was then injected and forced into the test receptacle and treated in accordance with the method that was described hereinbefore. Water stopped flowing from the perforated bottom of the receptacle after 130 seconds and no flow of water was observed during the next 24 hours.

The polyurethane-resin-forming compositions of the present invention are not only suitable for the sealing and strengthening of stone and geological formations as described in the foregoing disclosure, but are universally useful for filling cracks or fissures with a foamed urethane resin.

I claim:

1. A method of sealing and consolidating water-bearing geological formations which comprises
   intimately mixing
   a polyisocyanate selected from the group consisting of toluene diisocyanates, hexamethylene diisocyanates, diphenylmethane diisocyanates and mixtures of diphenylmethane diisocyanates containing polyisocyanates of polyphenyl-polymethanes,
   in about equal amounts by volume a polyol having a molecular weight between 400 and 600 and a hydroxyl number between 340 and 400,
   an accelerator in the amount of between 0.1 and 4% of the total weight of the polyisocyanate and polyol components, a foam stabilizer in an amount between 0.5 and 5% of the total weight of the polyisocyanate and the polyol components;

introducing said freshly prepared water-insensitive mixture into said formation which is required to be sealed against water and to be consolidated; and allowing said mixture to react with water to form a foam of urea derivatives and, since all of the water becomes bound, a non-foamed polyurethane resin which adheres to surfaces of said formation, so as to strengthen said formation.

2. The method of claim 1, in which the accelerator is present in an amount between 0.1 and 4% of the total weight of the polyisocyanate and polyol components.

3. The method of claim 1, in which the accelerator is present in an amount between 0.5 and 2% of the total weight of the polyisocyanate and polyol components.

4. The method of claim 1 in which the foam stabilizer is present in an amount between 0.5 and 5% of the total weight of the polyisocyanate and polyol components.

5. The method of claim 1, in which the foam stabilizer is present in an amount between 0.5 and 2% of the total weight of the polyisocyanate and polyol components.

6. The method of claim 1, in which the accelerator for the reaction between the polyisocyanate and polyol is a salt of a heavy metal and a carboxylic acid.

7. The method of claim 1, in which the accelerator for the reaction between the polyisocyanate and polyol is di-n-butyltin di(2-ethylhexanoate).

8. The method of claim 1, which the foam stabilizer is a liquid poly(dimethylsiloxane)-poly(oxyalkylene) block polymer.

* * * * *